Figure 1:
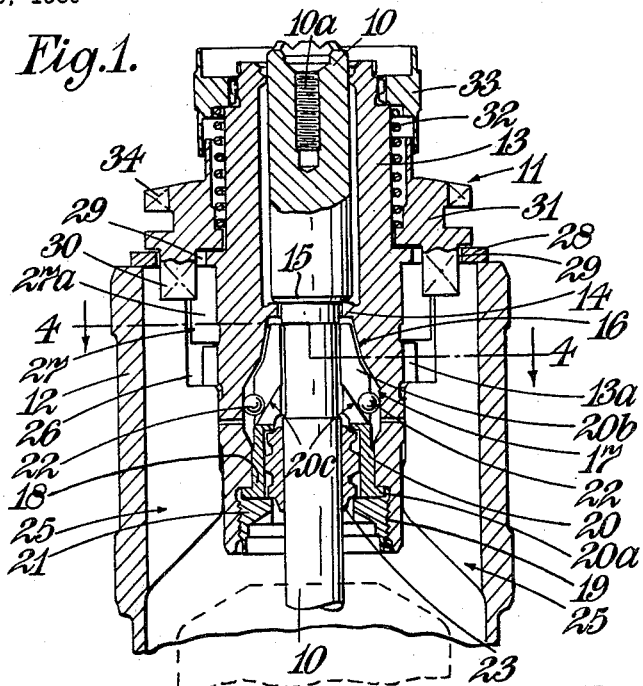

Nov. 24, 1964 P. H. JONES 3,158,545
SAFETY DEVICES FOR NUCLEAR REACTORS
Filed June 6, 1960 2 Sheets-Sheet 1

Nov. 24, 1964  P. H. JONES  3,158,545
SAFETY DEVICES FOR NUCLEAR REACTORS
Filed June 6, 1960  2 Sheets-Sheet 2
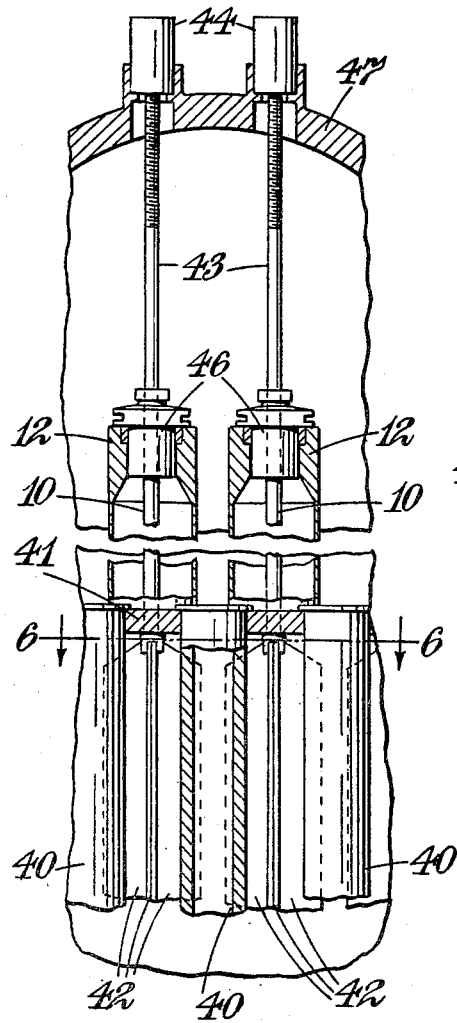
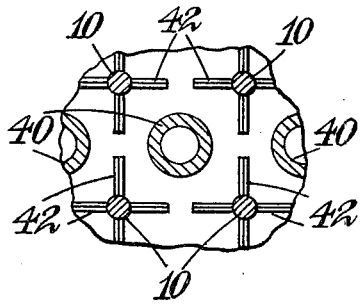

United States Patent Office 3,158,545
Patented Nov. 24, 1964

3,158,545
SAFETY DEVICES FOR NUCLEAR REACTORS
Peter Harris Jones, Littleover, England, assignor to Rolls-Royce & Associates Limited, Derby, England, a British company
Filed June 6, 1960, Ser. No. 34,256
Claims priority, application Great Britain, June 25, 1959, 21,909
8 Claims. (Cl. 176—36)

This invention relates to safety devices for use in connection with nuclear reactors of the class having absorber elements which are displaceable axially relative to fuel elements within the reactor between an inoperative position in which the absorber elements are clear of the fuel elements and the reactivity of the reactor is high, and an operative position in which the absorber elements are between the fuel elements to effect maximum neutron absorption and the reactivity of the reactor is a minimum. In normal operation of such a reactor the absorber elements are moved by power actuated operating means, and it may be arranged that under scram conditions the absorber elements are disconnected from the power actuated operating means and moved to their operative positions. The absorber elements, when so released, may be moved by gravity alone or by the combined effects of gravity and of spring biassing means which latter for design reasons may not be of sufficient strength to prevent the absorber elements being moved by gravity to their inoperative position if the reactor is inverted.

According to the present invention, a safety device for use with a nuclear reactor of the class specified in which the absorber elements are moved vertically between their operative and inoperative positions under scram conditions, comprises locking means to retain the absorber elements against substantial displacement from their operative positions, which locking means is adapted to be rendered operative on tilting of the reactor from its normal position through a preselected angle.

A safety device of this invention has an important use in connection with nuclear reactors which are liable to be tilted excessively, and prevents the reactivity of the reactor from being increased after scram operation by such tilting of the reactor as to render possible displacement of the absorber elements under gravity away from their operative positions. For example, the safety device may be provided in connection with a nuclear reactor powered marine craft, such as a submarine, to become effective when the craft turns turtle.

According to a preferred feature of this invention, the locking means includes normally inoperative locking elements of the jamming ball or the like kind which, when the reactor tilts excessively from its normal position, roll or slide to locking positions engaging both parts which move with the absorber elements, and a stationary part therby to restrain movement of the absorber elements. In one construction, each absorber element is carried by a rod and the locking means comprises for each absorber element an associated lock structure through which the rod extends, which lock structure is mounted in stationary structure and comprises a series of balls or the like jamming elements disposed around the rod in inclined channels in the lock structure, so that on excessive tilting of the reactor at least one of the balls or the like rolls along its channel into a jamming position between oppositely-facing shoulders provided in the lock structure and on the rod respectively to limit movement of the rod and absorber element towards the inoperative position, or into jamming contact with surfaces of the rod and the lock structure which converge in the direction in which the rod is moved to render the absorber element inoperative.

Figure 2:
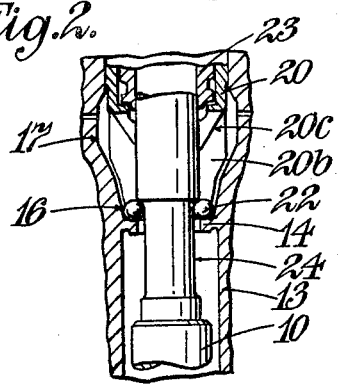
Figure 3:
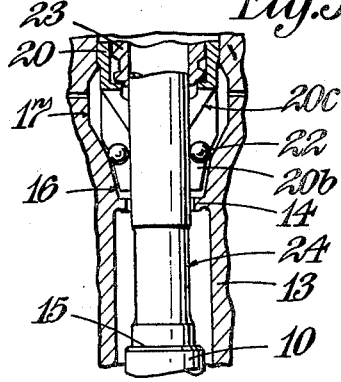
Figure 4:
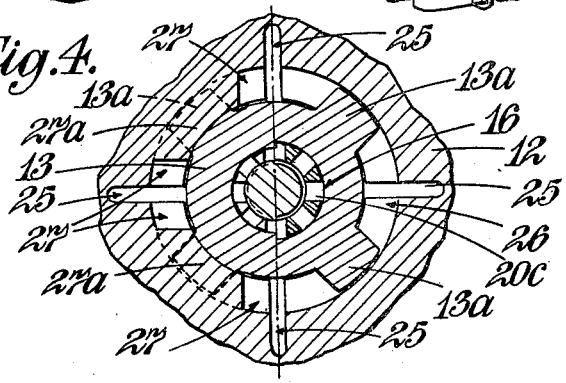

One form of safety device of this invention will now be described with reference to the accompanying drawings in which:

FIGURE 1 is a section through the device when inoperative,
FIGURES 2 and 3 are corresponding views showing the device in differing operative positions,
FIGURE 4 is a section on the line 4—4 of FIGURE 1,
FIGURE 5 illustrates diagrammatically a form of nuclear reactor in which the safety device is employed, and
FIGURE 6 is a section on the line 6—6 of FIGURE 5.

Referring to FIGURES 1 to 4, a support rod 10 for an absorber control element of a nuclear reactor is shown extending through a safety device 11 which is mounted in a tubular part 12 of the stationary structure of the reactor.

The absorber element is carried on the lower end of the rod 10 and the upper end of rod 10 is adapted for connection to an operating rod, the lower end of which may be screwed into threaded recess 10a. The operating rod may be moved axially by a suitable motor. To vary the reactivity of the reactor, the absorber elements are raised or lowered, and in FIGURE 1, the support rod 10 is shown in its lowest position corresponding to minimum reactivity. Under scram conditions, the operating rod is released from its motor and the parts are moved to the position shown.

It will be clear that, under scram conditions, if for any reason the reactor is inverted or tilted excessively, for example when the reactor is being employed to power a marine craft and the craft turns turtle, the absorber elements may tend to move from their lowest position, and the safety device illustrated is provided to limit such undesired movement.

The safety device consists for each absorber element of a lock structure which comprises an abutment sleeve 13 having a flange 14 internally of its bore to provide a limit stop for downward movement of the rod 10 which is formed with a shoulder 15 to abut the flange 14. The sleeve 13 is locked in the tubular part 12 as will be described below and its bore, below the flange 14, comprises a frusto-conical portion 16 whereof the diameter increases in a direction away from flange 14, a cylindrical portion 17 at the end of the frusto-conical portion 16, a seating land 18 and a threaded portion 19. An annular cage 20 is fitted in the bore below the flange 14 to surround the rod 10 and the cage is held in position by a lock ring 21 threaded into the portion 19, the lock ring clamping a flange 20a of the cage against the lower end of the land 18. The ring 21 also retains in position a guide member 23 through which the rod 10 slides.

The cage 20 at its upper end has a series of angularly-spaced fingers 20b projecting into the portions 17, 16 of the bore, and also has between each pair of fingers, ramps 20c which are inclined at an acute angle to the axis of the rod 10 so as to converge towards the rod in the upward direction.

The cage 20 houses a series of balls 22 which lie between the fingers 20b and when the nuclear reactor is in its normal attitude or is not excessively tilted the balls occupy the position shown in FIGURE 1.

The portion of the rod 10 just below the shoulder 15 is formed with a shallow peripheral channel 24.

If the reactor tilts sufficiently, at least one of the balls 22 will run down its ramp 20c either to a position between the channel 24 and the frusto-conical surface 16 (FIGURE 2) so that the ball 22 is trapped between oppositely facing shoulders afforded by the flange 14 and the normally lower end of the channel 24 respectively thereby limiting the extent of movement of the rod 10 away from the position of FIGURE 1 to approximately the axial dimension of the channel 24, or, if the rod 10 moves so rapidly that channel 24 of the rod passes the flange 14 before a ball can enter the channel, to a position (FIGURE 3) between the frusto-conical surface 16 and the surface of the rod 10 so that the rod is jammed by the wedge action produced by the rod tending to roll the ball along the frusto-conical surface 16 towards the flange 14.

In either case, the extent of movement of the rod 10 (and thus of the absorber element) from the position of FIGURE 1 will be limited.

The jamming of rod 10 by the balls 22 also ensures that if the craft turns turtle with the absorbers not in the fully operative position further movement of the absorber elements towards their inoperative position is prevented.

In the form shown, the abutment sleeve 13 is mounted in the tubular part 12 in the following way.

The tubular part 12 has a bore in which the sleeve 13 projects, and the wall of the bore is provided (FIGURES 1 and 4) with a series of angularly-spaced, axially-extending, inwardly-facing narrow slots 25 which pass through an unobstructed circumferential channel 26 extending around the bore. Above the channel 26, the slots 25 have portions 27 of increased width so as to form a series of angularly spaced dogs 27a at the upper end of the tubular part 12. The sleeve 13 is provided with an external, radially projecting, annular flange 28 which seats on the upper surface of the tubular part 12, and also with a series of external radially-projecting dogs 13a (FIGURE 4) which can pass axially through the widened slot portions 27 between the dogs 27a into the channel 26 and then be engaged below the dogs 27a by rotation of the sleeve 13, so positioning the sleeve axially in the tubular-part 12.

The flange 28 has a series of holes 29 (FIGURE 1) through which project axially-extending dogs 30 carried on a collar 31 slidably mounted on the sleeve 13 above the flange 28, and the collar 31 is urged by spring 32 into a position in which the dogs 30 project through the holes 29 and engage in the slot portions 27 so restraining rotation of the sleeve 13 and preventing disengagement of the dogs 13a. The spring 32 is retained in position by a ring 33 mounted on the upper end of the sleeve 13. The collar 31 is provided with a series of lugs 34 to enable it to be gripped for release purposes.

Referring now to FIGURES 5 and 6, there is shown part of a nuclear reactor in which the safety devices above described are employed. The reactor comprises a number of fuel elements 40 supported in a fixed plate 41, and a series of absorber elements by which the reactivity is controlled. Each absorber element has four absorber blades 42 of neutron absorbing material mounted at the end of its support rod 10 and, when the rods 10 are in the position of FIGURE 1, the blades 42 co-operate as shown in FIGURE 6 to shroud each fuel element 40 from each adjacent fuel element. Each rod 10 extends upwardly through an associated tubular part 12 having a safety device 46 as above described at its upper end.

Each absorber element 10, 42 has an operating rod 43, the lower end of which is secured to the rod 10 and the upper end of which is threaded to engage a motor driven nut device 44 which is held against axial displacement in the reactor casing 47, and by rotation of the nut device 44 the blades 42 of the absorber element may be raised from the position shown into the associated tubular part 12 to increase the reactivity, or may be lowered between the fuel elements 40 the position shown to reduce the reactivity. The devices 44 are arranged so that for scram close-down of the reactor the operating rods 43 are released from the devices and the absorber elements move under gravity to the minimum reactivity position shown, and the associated safety device 46 limits displacement of the absorber element from the minimum reactivity position in the event of excessive tilting of the reactor from its normal attitude.

One form of reactor with which the invention may be used is described in "The Shippingport Pressurised Water Reactor," published by Addison-Wesley Publishing Co. Inc. of Massachusetts in 1958.

I claim:

1. A nuclear reactor comprising fuel elements, absorber elements movable in the direction of their length between their operative positions, in which they are disposed between the fuel elements so as to effect maximum neutron absorption and their inoperative positions, in which they are withdrawn from, and disposed above, the spaces between the fuel elements, disengageable driving means for moving the absorber elements between their operative and inoperative positions, scram means which operate to disengage said driving means and permit the absorber elements to fall under gravity to their operative positions, and locking means adapted to engage the absorber elements and prevent their movement when and only when, the angle of tilt of the reactor from the upright exceeds a selected angle.

2. A nuclear reactor comprising fuel elements, absorber elements movable in the direction of their length between their operative positions, in which they are disposed between the fuel elements so as to effect maximum neutron absorption and their inoperative positions, in which they are withdrawn from and disposed above, the spaces between the fuel elements, vertical rods carrying said absorber elements, driving means engageable with said rods in order to move said absorber elements between their operative and inoperative positions, scram means which operate to disengage said driving means and permit said absorber elements to fall under gravity to their operative positions, and locking means comprising movable locking elements of the jamming kind, fixed jamming surfaces adjacent said rods, and fixed ramps, converging upwardly at a selected angle towards said rods and disposed below said jamming surfaces, said locking elements being guided in movement by said ramps so as to engage said jamming surfaces and said rods to prevent movement of said rods when the angle of tilt of the reactor from the upright exceeds said selected angle, said locking elements being out of engagement with said rods and said jamming surfaces at all other times.

3. A nuclear reactor comprising fuel elements, absorber elements movable in the direction of their length between their operative positions, in which they are disposed between the fuel elements so as to effect maximum neutron absorption and their inoperative positions, in which they are withdrawn from, and disposed above, the spaces between the fuel elements, a stationary structure and a vertical rod carrying each said absorber element, driving means engageable to drive said rods so as to move said absorber elements between their operative and inoperative positions, scram means which operate to disengage said driving means and permit the absorber elements to fall under gravity to their operative positions and locking means comprising for each absorber element a lock structure through which the associated rod extends, said lock structure being mounted in said stationary structure and having a series of channels converging upwardly at a selected angle towards said rod, a corresponding series of movable jamming elements disposed one in each of said channels, jamming shoulders in said lock structure disposed above said channels and adjacent said rod, whereby, when the reactor tilts from the upright through an angle greater than said selected angle, at least one of said jamming elements moves along its channel into jamming engagement between said jamming shoulders and the rod, restraining movement of the rod and its associated absorber element towards its inoperative position.

4. In a nuclear reactor having a reactor space, fuel elements in said space, absorber elements movable in the direction of their length between the operative position in which the absorber elements are disposed between the fuel elements and effect maximum neutron absorption and an inoperative position in which the absorber elements are withdrawn clear of the fuel elements and the reactivity of the reactor is high, power means connected to effect movement of the absorber elements between said operative and inoperative positions, scram means permitting rapid movement of the absorber elements into their operative positions, said direction having a first disposition in space when the reactor is upright; a safety device including locking means having a locking setting in engagement with the absorber elements preventing movement of the absorber elements towards their inoperative positions, and having an inoperative setting out of engagement with the absorber elements, said locking means being sensitive to the disposition of said direction in space and being moved from their inoperative setting to their locking setting on tilting of said direction through a selected angle from said first disposition due to tilting of the reactor from the upright, stationary structure and a vertical rod carrying each absorber element, the locking means comprising for each absorber element an associated lock structure through which the rod extends, which lock structure is mounted in the stationary structure and comprises a series of channels in said lock structure, said channels converging at a selected angle upwardly towards the rod, a corresponding series of movable jamming elements disposed around the rod one in each of said channels, jamming shoulders in the lock structure above said channels and adjacent the rod, so that on excessive tilting of the reactor from the upright at least one of the jamming elements moves along its channel into a jamming position between said jamming shoulders in the lock structure and the rod to limit movement of the rod and absorber element towards its inoperative position, the lock structure comprising an abutment sleeve having a bore which includes an upwardly-tapering frusto-conical portion and an inwardly-projecting radial flange at the narrower end of the frusto-conical portion defining one of the jamming shoulders, a cage accommodated within the sleeve below the frusto-conical portion of its bore, the cage having a series of angularly-spaced fingers projecting into the frusto-conical portion of the bore and having ramps between the fingers, which ramps are inclined at an angle to the axis of the rod and converge with the axis in a direction towards the frusto-conical portion, said fingers and said ramps defining the channels, the jamming elements being accommodated between the fingers and having an inoperative position between the ramps and the sleeve and on excessive tilting of the reactor rolling down the ramps into jamming engagement with the frusto-conical portion of the bore and the rod.

5. In a nuclear reactor having a reactor space, fuel elements in said space, absorber elements movable in the direction of their length between the operative position in which the absorber elements are disposed between the fuel elements and effect maximum neutron absorption and an inoperative position in which the absorber elements are withdrawn clear of the fuel elements and the reactivity of the reactor is high, power means connected to effect movement of the absorber elements between said operative and inoperative positions, scram means permitting rapid movement of the absorber elements into their operative positions, said direction having a first disposition in space when the reactor is upright; a safety device including locking means having a locking setting in engagement with the absorber elements preventing movement of the absorber elements towards their inoperative positions, and having an inoperative setting out of engagement with the absorber elements, said locking means being sensitive to the disposition of said direction in space and being moved from their inoperative setting to their locking setting on tilting of said direction through a selected angle from said first disposition due to tilting of the reactor from the upright, vertical rods supporting said absorber elements, said first disposition of the direction being vertical and said locking means including movable locking element of the jamming kind, fixed jamming surfaces adjacent said rods, and fixed ramps below the jamming surfaces, said ramps converging upwardly at a selected angle towards said rods, said locking elements being guided in movement by said ramps when the reactor tilts excessively from its upright position from an inoperative setting clear of said rods and jamming surfaces to a locking setting engaging both said rods and said jamming surfaces thereby to restrain movement of the absorber elements towards their inoperative positions, said locking means comprising for each absorber element an associated lock structure, stationary structure comprising a tubular part in which the lock structure is housed, the tubular part having an internal circumferential channel and inwardly projecting dogs at one side of the channel, and a series of radially-outwardly-projecting dogs on the lock structure, which outwardly-projecting dogs are entered into the circumferential channel in the tubular part by being passed between the inwardly-projecting dogs and then trapped axially by rotation in the channel to behind the inwardly projecting dogs.

6. A safety device according to claim 4, said rod having a peripheral channel formed therein, said channel defining a shoulder facing towards said channels in lock structure.

7. A safety device according to claim 5, comprising releasable means holding the lock structure against rotation from the position in which the dogs on the lock structure are in the channel behind the inwardly-projecting dogs.

8. A safety device according to claim 7, the releasable means comprising a collar slidable on the sleeve and having axially-extending dogs, a flange on the lock structure having holes therein, axial slots in the tubular part, the axially-extending dogs projecting through the holes into engagement with the axial slots, and a spring loading the collar to maintain said engagement.

References Cited by the Examiner
UNITED STATES PATENTS

| 2,224,147 | 12/40 | Ehler | 188—67 X |
| 2,228,244 | 1/41 | Baker. | |
| 2,588,479 | 3/52 | Burchett et al. | 188—174 |

FOREIGN PATENTS 1,159,648  2/58  France.

OTHER REFERENCES

Schultz: Control of Nuclear Reactors and Power Plants, 1955, p. 119, Pub. by McGraw-Hill.

Proceedings of the Interational Conference on Peaceful Uses of Atomic Energy, vol. 3. Publ. by U.N., N.Y., 1955, pp. 214, 218 and 224.

NAA–SR3859, Maritime Organic Moderated and Cooled Reactor, May 27, 1959, pp. (III–7)–(III–10).

Drawing plates VI and VIII of NAA–SR–3859.

CARL D. QUARFORTH, Primary Examiner.

LEON D. ROSDOL, REUBEN EPSTEIN, Examiners.